April 15, 1952     H. J. BLOCK     2,593,003

SUPPORT FOR COOKING UTENSILS

Filed March 8, 1946

INVENTOR:
HERBERT J. BLOCK

BY     ATTY.

Patented Apr. 15, 1952

2,593,003

UNITED STATES PATENT OFFICE 2,593,003

SUPPORT FOR COOKING UTENSILS

Herbert J. Block, Chicago, Ill.

Application March 8, 1946, Serial No. 652,989

9 Claims. (Cl. 126—215)

The invention relates to cooking utensils and more particularly to a utensil used in conjunction with standard cooking utensils.

It is an object of the invention to provide a device forming a base for a cooking utensil and capable of protecting the burner flame to avoid being extinguished when the content of the utensil boils over.

A further object is to provide a device where the heat emanating from the burner is evenly distributed over the bottom of the cooking utensil.

A still further object is to provide an auxiliary cooking utensil which causes the heat radiated from the burner to follow a plurality of paths leading to the entire area of the bottom area of the cooking vessel whereby the food in the vessel is evenly heated therein and prevents burning of the food or adherence thereof to the wall or bottom of the vessel.

Figure 1:
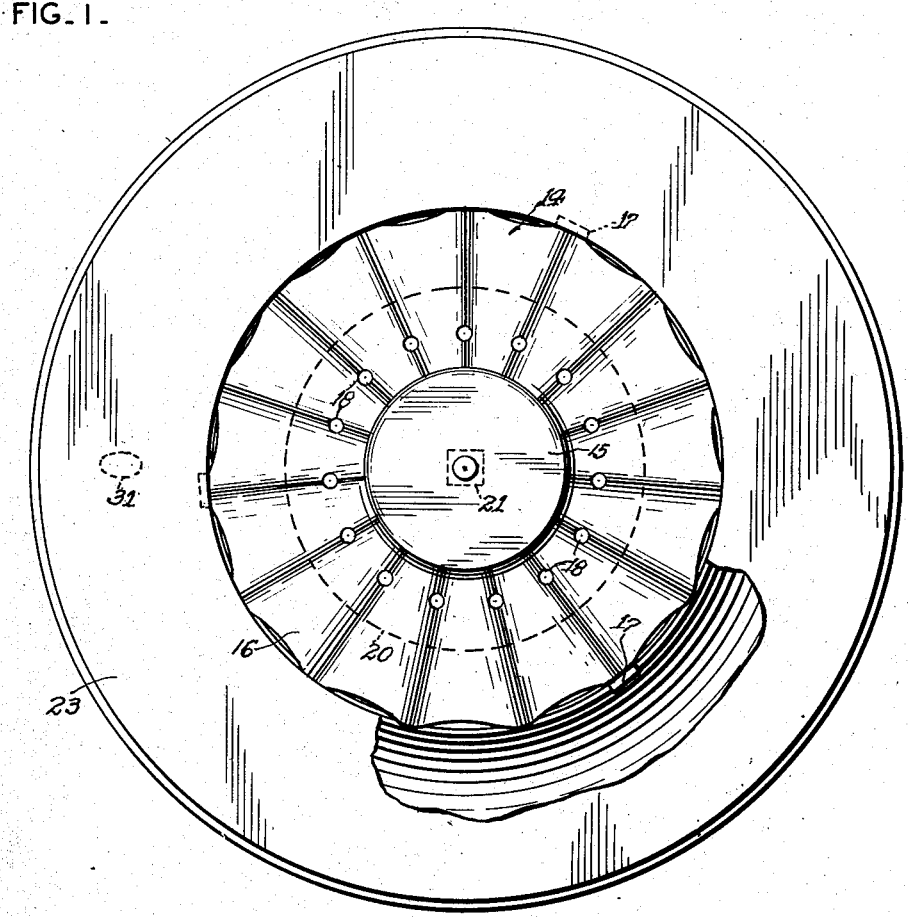

With these and other important objects in view which will become apparent from a disclosure of the invention, the latter comprises the means described in the following specification, particularly pointed out in the claims forming a part hereof, and illustrated in the accompanying drawing, in which Fig. 1 is a top plan view of a device constructed in accordance with my invention.

Figure 2:
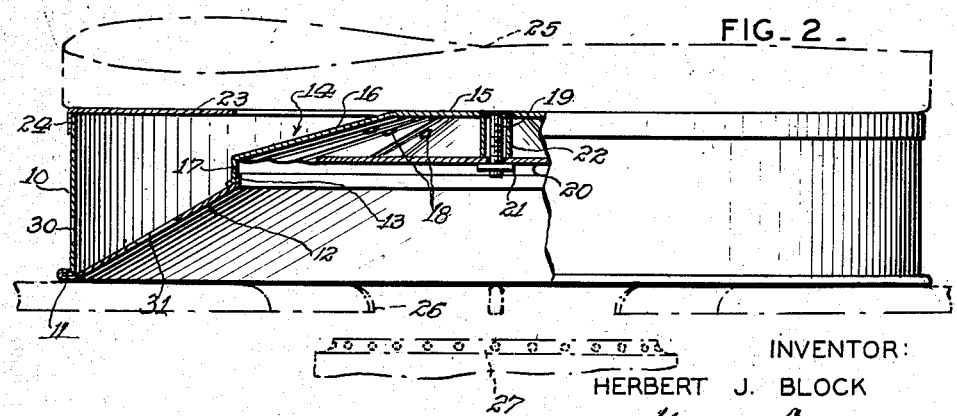

Fig. 2 is a part side elevation and part cross section of the device.

The device comprises a cylindrical structure having an annular wall or ring 10 of relatively short height which at the lower end is bent outwardly as at 11.

A frusto-conical member 12 of lesser height than the ring or wall 10 extends at the lower end beyond the lower end of said structure and is crimped about the end 11 of said cylinder to be rigidly secured thereto.

The upper end of the member 12 is bent upwardly to provide a neck 13 above the frusto-conical member 12. A dome-like deflector 14 also of frusto-conical shape, is provided which comprises a flat central annular top face part 15 and integral therewith a part 16 tapering downwardly and terminating a slight distance above the neck 13. A plurality of legs 17 extending from the lower edge of the dome or deflector 14 engage the outer side of the neck 13 and rest on the member 12 to support the deflector or dome 14 above the member 12.

It will be readily understood that the lower end of the dome or deflector 14 and upper end of member 12 being spaced an annular opening is defined for a purpose hereinafter further explained.

The deflector 14 may at the tapering portion 16 be undulated. A plurality of apertures 18 in circular formation are provided in the deflector part 16. The particular arrangement of the apertures may be varied.

The dome or deflector 14 at the center has secured thereto a threaded bolt 19 which passes through an aperture in a horizontal circular baffle plate 20 a short distance below the dome part 15 and having a diameter less than the diameter of the lower dome end. A nut 21 is secured to the bolt to hold the baffle 20 in position. A spacer sleeve 22 surrounds the bolt 19 between the parts 15 and 20.

An annular top or cover member 23 formed with a downwardly extending flange 24 is placed on the wall or ring 10 and the central opening of member 23 has a diameter substantially equal to the diameter of the lower end of the deflector 14.

The annular top member 23 is in horizontal alignment with the flat part 15 of the deflector 14 and both parts form a support for the cooking utensil 25 shown in dash and dotted lines in Fig. 2.

The device is placed on the grating 26 over the burner 27 indicated in dash and dotted lines in Fig. 2.

In use when the device is placed on the grating of a cooking stove and supports the cooking vessel, the heated gases will strike the baffle 20 and will flow therealong to the deflector where they will pass through the opening between the members 14 and 12 and reach the lower face of the top member 23. The gases will also flow through the openings 18 and reach the central portion of the bottom of the cooking vessel 25.

Thus the heated gases reach every portion of the vessel bottom ensuring a more rapid cooking and obviating burning of the food and adherence thereof to the walls of the vessel.

The cylindrical wall 10 has an opening 30 and the member 12 has an opening 31 to permit visual examination of the flame of burner 27.

The cylindrical member 10 thus constitutes a base placed over the burner of a stove and carrying the cooking utensil, the parts 12 and 23 assisting in protecting the burner flame from being extinguished due to overflow.

In addition the heated gases are deflected to reach the entire bottom area of the cooking utensil effecting uniform heating of the food in the utensil.

While the drawing shows one embodiment of the invention, numerous changes and alterations may be made without departing from the spirit of the invention.

I, therefore, include all modifications, revisions and alterations which fall within the scope of the invention as defined in the appended claims.

I claim:

1. A device for supporting a cooking vessel comprising an annular hollow base having a cover with a large central opening therein, and completely open at the bottom, a hollow frusto-conical member in said base secured to the lower end of said base, an apertured dome-like deflector supported on said member and having its upper part flush with the cover of said base, said deflector having its lower end slightly spaced above the upper end of said member to provide a circular gap, and a horizontal baffle plate in said deflector and secured thereto to occupy a position below said dome-like deflector and above the circular gap.

2. A device for supporting a cooking vessel on a grate above a stove burner and comprising an annular hollow base having a top portion with a large central opening, said base being completely open at the bottom, a hollow frusto-conical member in said base secured to the lower end of said base, a dome-like apertured deflector also of frusto-conical shape and supported on said member and having its upper part flush with the top portion of said base, said deflector having its lower end slightly spaced above the upper end of said member to provide a circular gap, and a horizontal plate in said deflector and secured thereto to occupy a position below the top of said dome deflector and above the circular gap to direct heated gases toward the gap, said base and said member being provided with aligned openings to enable observation of the flame.

3. A device for supporting a cooking vessel on a stove grating above a burner, said device comprising: an annular base 10, a frusto-conical member 12 having a lower peripheral edge crimped into attachment with lower peripheral edge portions of said base, a dome-like deflector 16 having legs 17 mounting the same on said member 12 and having a lower peripheral edge portion spaced from the upper peripheral edge portion of said member 12 to afford a gap, and an annular top member 23 on said base and having a central opening spaced above the central region of said deflector.

4. A device as defined in claim 3 and further characterized by the provision of a baffle 20 attached pendently to, and spaced below, said deflector.

5. A device of the class described comprising a base structure adapted to rest on a stove grating and comprising a ring 10 having an annular top 23, and heat deflecting means comprising: a first hollow frusto-conical member 12 attached at its lower edge region to lower edge portions of said ring, a deflector 16 also of approximately frusto-conical shape and supported concentrically by said member and having lower edge portions spaced from upper edge portions of the first frusto-conical member to afford a passage, said deflector having an upper top portion 15 substantially flush with said top 23 but spaced from the inner periphery of the latter.

6. The structure defined in claim 5 and further characterized by the provision of a baffle plate 20 supported pendently from said top portion 15 and having a peripheral edge spaced from the inner face of said deflector.

7. A device of the class described comprising two hollow substantially frusto-conical members mounted in superposed complementary relation, one smaller than the other, the smaller one of said members being positioned above, and supported by, the larger and lower one of said members, said smaller member having a lower peripheral margin spaced from the upper peripheral margin of said larger member to provide a gap therebetween; and a ring-shaped wall surrounding said members and attached around its lower margin to lower marginal portions of said lower member.

8. The device of claim 7 further characterized in that said ring-shaped wall has a top member with a central opening having peripheral margins in vertical alignment with the marginal portions of said frusto-conical members forming said gap.

9. The device set forth in claim 8 and further characterized in that the upper one of said frusto-conical members has a closed flat face disposed centrally of the opening in said top member of the ring-shaped wall, and said flat top face lying substantially flush with the surface of said top member of the wall.

HERBERT J. BLOCK.

REFERENCES CITED

The following references are of record in the file of this patent:

UNITED STATES PATENTS

| Number | Name | Date |
| --- | --- | --- |
| 271,158 | Thomas | Jan. 23, 1883 |
| 418,244 | Smith | Dec. 31, 1889 |
| 743,861 | Gregory | Nov. 10, 1903 |
| 860,841 | Symmons | July 23, 1907 |
| 862,719 | Davis | Aug. 6, 1907 |
| 1,431,696 | Shakland | Oct. 10, 1922 |
| 1,864,715 | Detwiler | June 28, 1932 |
| 2,003,773 | Gross | June 4, 1935 |
| 2,030,519 | Hamilton | Feb. 11, 1936 |

FOREIGN PATENTS

| Number | Country | Date |
| --- | --- | --- |
| 20,927 | Great Britain | of 1903 |